United States Patent [19]
Vilen et al.

[11] 3,760,936
[45] Sept. 25, 1973

[54] DISHWASHER CONVEYOR SYSTEM

[75] Inventors: Erik O. Vilen, La Grange Park; Vytas Zygas, Cicero, both of Ill.

[73] Assignee: G.S. Blakeslee & Co., Chicago, Ill.

[22] Filed: Nov. 22, 1971

[21] Appl. No.: 200,966

[52] U.S. Cl. .............................. 198/181, 198/203
[51] Int. Cl. ............................................. B65g 15/00
[58] Field of Search.................. 198/203, 232, 110, 198/181

[56] References Cited
UNITED STATES PATENTS

| | | | |
|---|---|---|---|
| 1,279,579 | 9/1918 | Perkins | 198/203 |
| 1,960,719 | 5/1934 | Stibbs | 198/203 |
| 2,797,793 | 7/1957 | Wilde et al. | 198/110 |
| 2,516,499 | 7/1950 | Albright | 198/203 X |
| 3,565,239 | 2/1971 | Walker et al. | 198/181 |

FOREIGN PATENTS OR APPLICATIONS

| | | | |
|---|---|---|---|
| 1,189,449 | 3/1965 | Germany | 198/203 |

*Primary Examiner*—Evon C. Blunk
*Assistant Examiner*—Douglas D. Watts
*Attorney*—Johnson, Dienner, Emrich

[57] ABSTRACT

A conveyor system adapted to move soiled ware in an orbital path and through a series of pre-wash, wash and rinse sections. A plurality of conveyor sections having means for holding the soiled ware are pivotally connected together at their inner ends to form a continuous series. The conveyor sections have roller means at their inner and outer ends which are in rolling engagement, respectively, with inner and outer orbital tracks formed on a horizontal platform. A drive assembly uses an endless series of spaced apart drive members which move in a closed loop path that has a portion coinciding with a portion of the path for the inner ends of conveyor sections. The drive members are spaced apart so that only one drive member is in driving engagement with the conveyor sections at any one instance of time.

6 Claims, 8 Drawing Figures

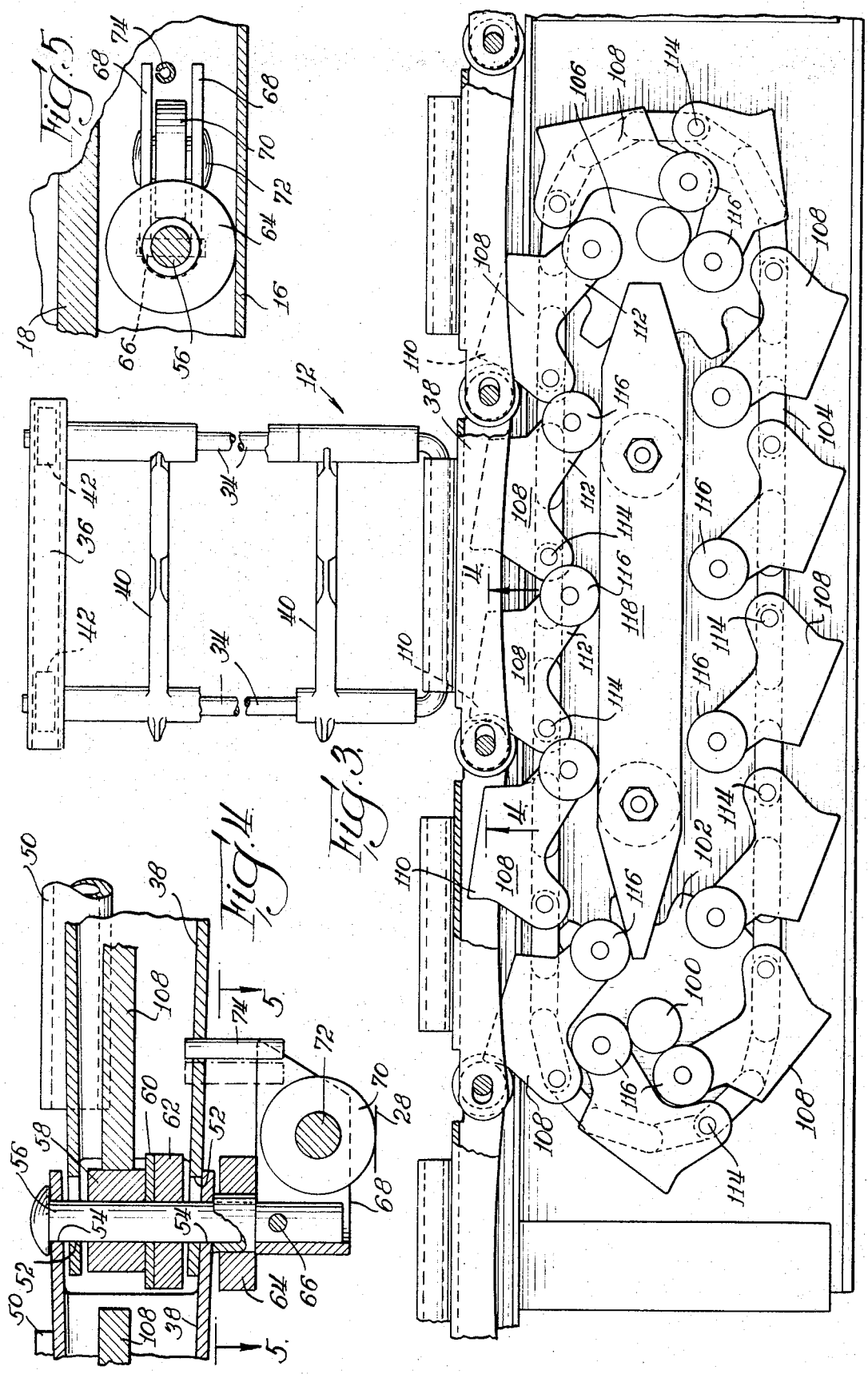

DISHWASHER CONVEYOR SYSTEM

BACKGROUND OF THE INVENTION

This invention relates to a conveyor system for a commercial dishwasher and in particular, a conveyor system adapted to carry soiled dishes in a closed horizontal path through various dishwashing compartments.

One design problem encountered in any horizontal type closed loop conveyor system is to provide some means to take up the slack arising in the closed-loop driven link arrangement because of its inherent characteristic to expand in length after long periods of use. Most conveyor systems employ some sort of adjustable linkage device which may be mechanically adjusted from time to time to provide the necessary slack take-up adjustment.

One object of this invention is to provide a means for automatically taking up the slack as it occurs in a closed loop drive link arrangement without the need for any adjustment device.

A frequent item of repair in conveyor system is the replacement of the lugs or chain links used to drive the conveyor because they no longer mesh with the driven member after their dimensions have been altered by wear. Also these conveyor systems are relatively expensive to manufacture because of the close tolerances required to obtain proper meshing.

Another object of this invention is to provide a conveyor drive arrangement that is not susceptible to prior art wear problems and do not have to be made with close tolerances between the drive and driven belt members.

All dishwasher conveyor systems have a safety trip device to stop the conveyor in the event an article gets jammed between the moving carrier racks and the support table. Once the conveyor stops it is sometimes quite difficult to dislodge the article because the conveyor system is locked in position.

A still further object of this invention is to provide a means to momentarily reverse the drive system upon actuation of the safety trip switch to permit ready removal of any articles jamming the movement of the conveyor.

Another object is to provide a unique manner of hingedly connecting the carrier racks to the conveyor assembly to provide access to the support table beneath the series of carrier racks.

These and other objects will become apparent from the following description, the accompanying drawings and the appended claims.

SUMMARY OF THE INVENTION

A conveyor system for use in a commercial dishwasher apparatus having a support platform with inner and outer orbital tracks to define an orbital path on which a plurality of connected conveyor sections extend transversely in a continuous series. Pivot means connect the inner ends of the conveyor sections and roller means at the inner and outer ends of each conveyor section provide rolling engagement with the orbital tracks. The conveyor drive assembly comprises a plurality of spaced apart drive members which are driven in a closed loop path by an endless chain drive arrangement. A portion of the closed loop path coincides with a portion of the path traced by the pivot means. The drive members are spaced apart relative to the pivot means so that only one drive member is in driving engagement with the pivot means at any single instant of time.

One feature of this invention is an automatic length compensating means to keep the distance between adjacent pivot means constant despite normal stretching of the inner ends of the conveyor sections. Another feature is to provide a hinged connection at the inner ends of the conveyor sections to allow their outer ends to be swung upwardly for cleaning the area below.

A new safety feature is provided by providing means for reversing the conveyor drive a short distance to free jammed articles.

DESCRIPTION OF DRAWINGS

For a better understanding of this invention reference may be made to the accompanying drawings, in which:

FIG. 3 is a partial plan view of FIG. 1 showing the drive assembly for the conveyor system and one of the carrier racks and is taken along the line 3—3;

FIG. 4 is a cross sectional view taken along the line 4—4 of FIG. 3 and looking in the direction of the arrows;

FIG. 5 is a cross sectional view taken along the line 5—5 of FIG. 4 and looking in the direction of the arrows;

FIG. 6 is a plan view of one of the conveyor links used to pivotally connect the inner ends of the conveyor sections;

FIG. 7 is a side elevational view of FIG. 6; and

DESCRIPTION OF PREFERRED EMBODIMENT

Figure 1:
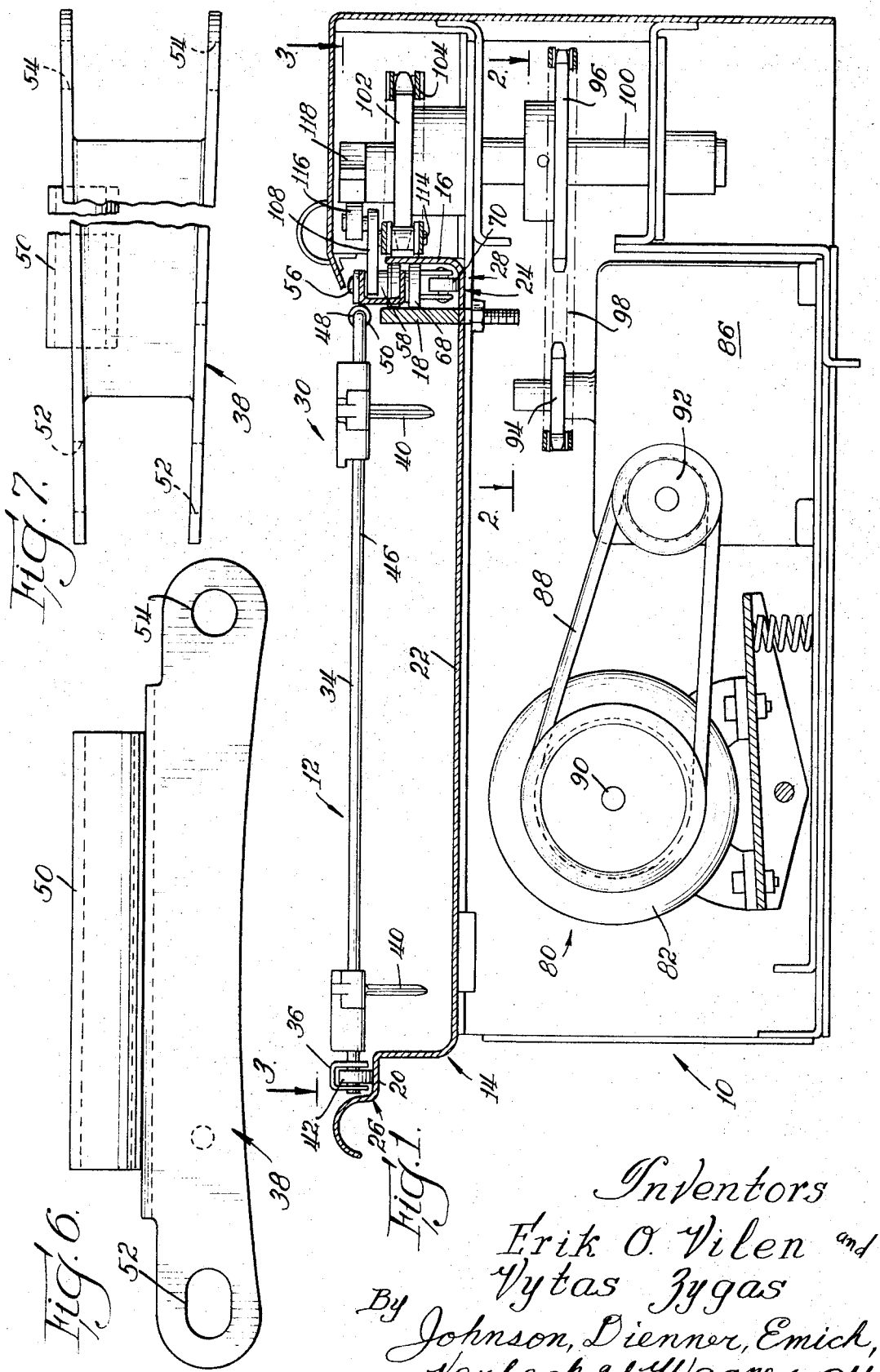
FIG. 1 is a sectional view of a dishwasher conveyor system incorporating the principle of this invention.

Referring to FIG. 1 there is shown a conveyor system 10 which is particularly adapted to convey soiled ware through one or more housings in which pre-washing, washing and/or rinsing of the soiled ware is effected. The conveyor system 10 is designed to move a continuous horizontal conveyor unit 12 in an orbital path on track surfaces presented by an orbital supporting table or platform 14.

Supporting table 14 is provided with an inner vertical wall portion 16, an inner vertical rail 18, an outer ledge portion 20, and a bottom wall surface 22. The inner vertical wall portion 16 constitutes a continuous inner vertical conveyor track indicated generally by reference numeral 24 that extends in a closed orbital path. Outer and inner horizontal conveyor tracks 26 and 28 are defined, respectively, outer ledge portion 20 and bottom wall surface 22 at its inner lateral edge. For a detailed showing of the dishwasher sections and conveyor tracks reference may be made to U.S. Pat. No. 3,565,239, which issued on Feb. 23, 1971.

A continuous horizontal conveyor unit 30 is supported on the outer and inner horizontal conveyor tracks 26 and 28, and guided by vertical conveyor track 16 for movement in an orbital path. Referring to FIG. 3, the conveyor unit 30 comprises a series of conveyor sections 32 which extend transversely of the orbital path and are pivotally interconnected at their inner ends.

Each of the conveyor sections 32 includes a pair of parallel spaced-apart cross rods 34, a first frame member or strap 36 rotatably mounting the outer ends of the rods 34, and a second frame member or strap 38 rotatably mounting the inner the inner ends of the rods 34. The cross rods 34 provide support for and are interconnected by a plurality of flights or links 40 of substantially W-shape. For further details concerning the links 40, reference may be had to U.S. Pat. No. 3,086,641, which issued Apr. 23, 1963 to John cumming.

Rotatably mounted on the outer ends of cross rods 34 and nestled within U-shaped strap 36 are rollers 42 which have rolling engagement with the outer horizontal track 26. Cross rods 34 are formed from a U-shaped rod 46 whose bight portion 48 fits loosely through a cylindrical sleeve or collar 50 secured on the rear surface of U-shaped inner strap 38. By virtue of this arrangement, it is possible to swing each conveyor section 32 upwardly about its inner end to provide convenient access to the bottom surface 22 of support table 14 for cleaning thereof or to retrieve an article.

As clearly shown in FIGS. 6–7, the U-shaped strap 38 has an elongated tapered body with aligned apertures 52, 54 at its two ends to receive a linking pivot pin 56. Aperture 52 has an oval shape through which the pivot pin 56 loosely fits for reasons that will be hereinafter described. As depicted in FIG. 4, the narrow tapered end of strap 38 nestles inside the wider end of the adjacent strap and pivot pin 56 is inserted down through the aligned apertures to provide a pivotal connection. Rotatably mounted on the pivot pin 56 is a link roller 58, spacer 60 and upper and lower rollers 62, 64. As depicted in FIG. 1, upper and lower rollers 62, 64 ride along vertical track 16.

At the bottom of pivot pin is secured, as by rivet 66, a U-shaped bracket 68 (FIG. 5) which rotatably supports roller 70 by means of axle pin 72. Projecting down from the tapered end of each strap 38 is a guide pin 74 which is juxtapositioned behind roller 70. Guide pin 74 serves the important function of preventing the inner straps 38 from jamming against the rail supports in the event the conveyor is suddenly moved in reverse (to the right as viewed in FIGS. 3 and 4). Upon a sudden reversal of direction, bracket 68 would engage the lower end of guide pin 74 and prevent buckling.

Referring now to FIGS. 1 and 3, there is shown the drive assembly 80 for the conveyor system comprising an electric drive motor 82 whose output shaft drives the input to speed reducer 86 through the endless belt 88 trained about pulleys 90 and 92. A sprocket 94 mounted on the output shaft of speed reducer 86 is coupled to sprocket 96 by endless sprocket chain 98 to turn vertical shaft 100 on the upper end of which is fixed drive gear 102. An endless sprocket chain 104 is trained about drive gear 102 and idler gear 106 for moving a plurality of drive members 108 in a closed loop path.

Drive members or lugs 108 having a drive portion 110 and a guide portion 112 are pivotally supported by pivot pins 114 extending upwardly from sprocket chain 104 at equal spaced intervals. A cam follower 116 in the form of a roller is rotatably mounted on the guide portion 112 and cooperates with a cam member 118 to guide the movements of the drive portion of each lug 108.

The forward face 120 of each drive member 108 is adapted to engage the link roller 58 (FIG. 4). The cam follower 116 rides along the outer lateral edge of the cam 118 to move the drive member into a driving engagement orientation with the link roller 58. In the embodiment shown, an odd number of lugs 108 are selected and spaced so that alternate lugs do not engage the link rollers during each cycle for the purpose of reducing wear on the lugs and thereby increasing their effective life expectancy.

One of the critical and important aspects of this invention is to select the distance or pitch separating alternate drive members or lugs 108 to be less than the distance between link rollers 58. By establishing this relationship, it is possible to avoid the gear meshing problems of prior art conveyor systems. By virtue of this arrangement, only one drive lug 108 is in driving engagement with the horizontal conveyor unit 30 at any single instant of time. When the lug 108 which is driving the conveyor unit 30 reaches the rearward end of cam 118 and moves transversely out of the path of link roller 58, there is a momentary lag in time until the succeeding lug (two lugs away) engages the next succeeding link roller. Because the pitch between adjacent link rollers is greater than the pitch between alternate drive lugs, there are no close tolerance factors to be concerned with in designing the drive system and normal wear of the drive lugs will not affect its operation. Due to the periodic momentary lapses in driving the conveyor unit 30, it will be appreciated that the average speed of the drive lugs must be greater than the average speed of the conveyor unit.

Another important feature of this invention is its ability to automatically compensate for inherent stretching of the conveyor unit 30 after a period use to keep the effective length of its inner perimeter constant. This length compensation is provided by means of the oval slot 52 (FIG. 6). Because of the oval slot 52 in each inner strap 38, the length of the inner perimeter of conveyor section can be substantially varied depending on where each pivot pin 56 is located within each slot 52. Because the conveyor unit is being pushed the effective length of its inner perimeter inherently tends to remain substantially constant, and as the U-shaped straps stretch in length the pivot pin 56 makes a corresponding change in its position relative to slot 52 to keep the distance between adjacent pivot pins substantially constant.

Figure 2:
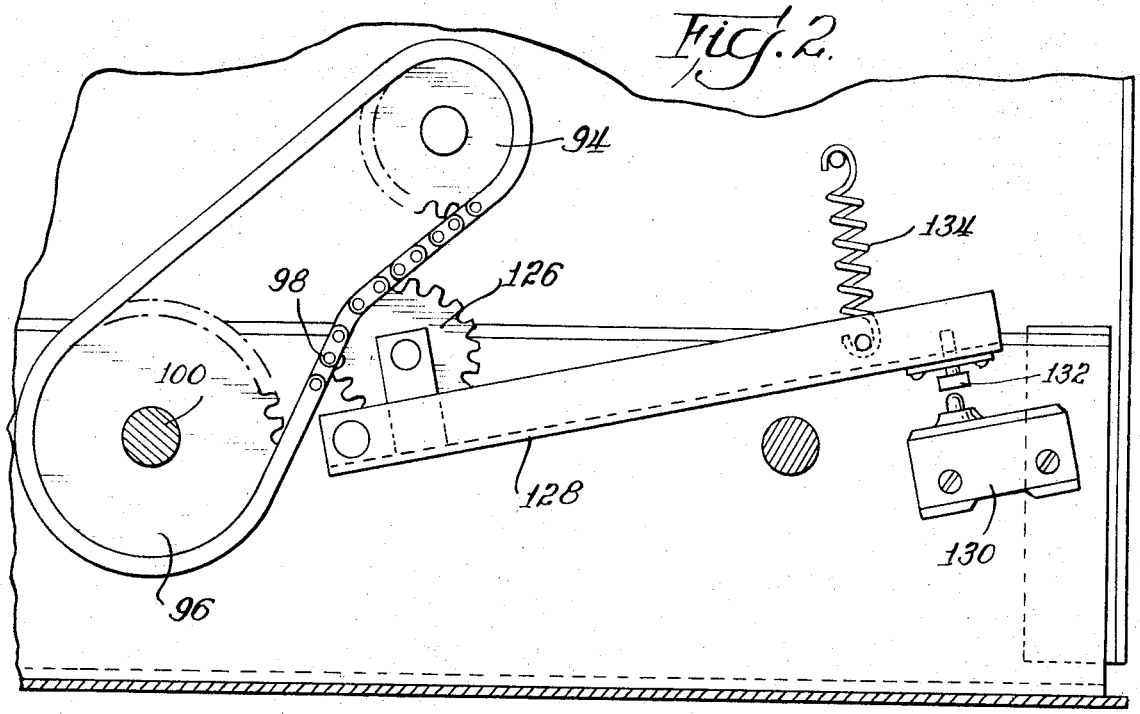
FIG. 2 is a partial sectional view taken along the line 2—2 and looking in the direction of the arrows.

A common safety feature in dishwasher conveyor systems is to provide a trip mechanism that is actuated to stop the conveyor drive whenever an article gets jammed between one of the conveyor racks and the supporting table. A trip switch means for this purpose is shown in FIG. 2, in which the endless link chain 98 between sprockets 94 and 96 drives idler wheel 126. Idler wheel 126 is rotatably mounted adjacent the inner pivoted end of lever 128. An electric switch 130 is disposed adjacent the free end of lever 128 and adapted to be actuated by button 132 secured on the free end of lever 128. A spring 134 biases the free end of lever 128 away from switch, and this spring force is overcome whenever something gets jammed in the conveyor unit causing chain 98 to become taut. As the chain 98 tightens idler wheel 126 is pushed downwardly and depresses lever 128 a sufficient distance to activate switch 130. Switch 130 interrupts the current flow to drive motor 82 and thereby stops the conveyor.

Figure 8:
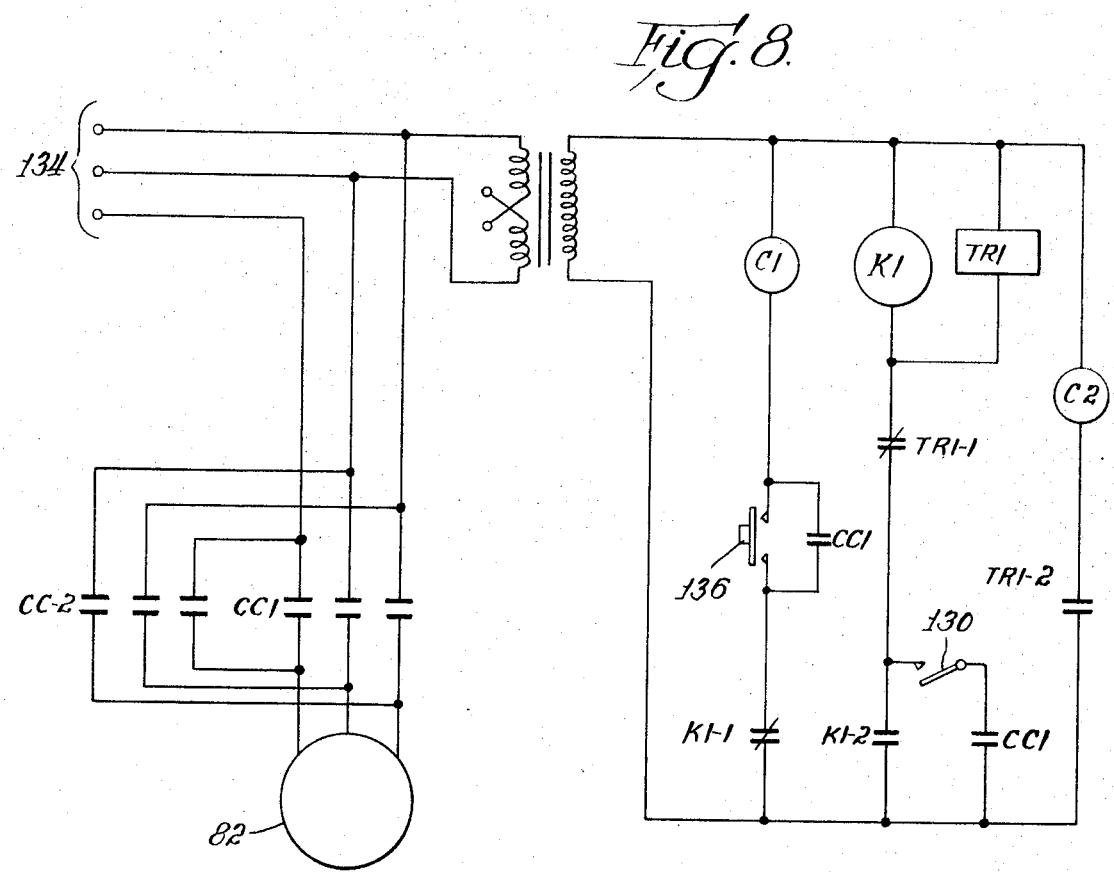
FIG. 8 is a schematic electrical wiring diagram for the conveyor system of this invention.

FIG. 8 depicts a schematic diagram for the conveyor drive system which operates on a 208 volt, three phase, 60 cycle supply voltage input into leads 134. To energize the conveyor drive, start button 136 is depressed which completes the circuit through the coil for relay solenoid C1 and closes relay contacts CC1 to energize conveyor drive motor 82.

When trip switch means closes switch 130, the circuit through solenoid relay K1 is complete and the normally closed relay contacts K1-1 are opened to deenergize conveyor drive motor 82, and the normally open contacts K1-2 are closed to complete a hold circuit through solenoid K1. Also, time delay control means TR1 is energized. Time delay control relay TR1 is set with a two second delay at the end of which time it opens contacts TR1-1 and closes contacts TR1-2 to energize a current switch reversal solenoid C2. The energization of solenoid C2 closes relay contacts CC2 across the motor 82, which energize the conveyor motor 82 to turn in the reverse direction. After three seconds, time delay control relay TR1 deenergizes and contacts TR1-2 open to deenergize solenoid coil C2 and stop motor 82.

It will be appreciated that the three seconds energization of motor 82 in the reverse direction will back up the conveyor unit 30 a sufficient distance to allow the jammed object to be easily removed.

While there has been shown and described a preferred embodiment of the present invention, it will be understood by those skilled in the art that various rearrangements and modifications may be made therein without departing from the spirit and scope of the invention.

We claim:

1. A conveyor system for use in a dishwashing machine comprising continuous horizontal conveyor means movable in an orbital path, said conveyor means including a series of individual conveyor sections extending transversely of said orbital path, said conveyor sections comprising a pair of parallel spaced apart rods extending transversely of said orbital path, frame members supporting the inner and outer ends of said rods, and roller members carried by said inner and outer frame members, continuous inner and outer orbital tracks on which said roller members are adapted to roll, pivot means for pivotally connecting the inner ends of adjacent conveyor sections, and a conveyor drive assembly for pushing said conveyor section around said orbital tracks comprising an endless series of spaced apart drive members and drive means for moving said drive members in a closed loop path a portion of which coincides with a portion of the path traced by said pivot means, where the distance separating said spaced apart drive members relative to the distance between adjacent pivot means is selected so that only one drive member will be in driving engagement with one of said pivot means at any single instance in time, and where the inner end of each of said conveyor sections includes length compensating means to keep the length between adjacent pivot means substantially constant and thereby maintain the effective length of the inner perimeter substantially constant despite stretching of the inner end of said conveyor sections. effective 2. A conveyor system as defined in claim 1, wherein said pivot means comprises a pivot pin and wherein said inner end of said conveyor sections includes an elongated strap member having mounting apertures formed in its opposite ends for receiving said pivot pin where one of said apertures is slightly larger in size than said pivot pin and the other of said apertures is an elongated slot of a width slightly greater than said pivot pin extending lengthwise of said strap, whereby the position of said pivot pins relative to said elongated slots is shifted in direct portion to any stretching of said strap member to thereby maintain the efeective length of said inner perimeter substantially constant.

3. A conveyor system as defined in claim 1, further comprising a cam member disposed parallel to said portion of said closed loop path, and wherein said drive members comprise a pivotally mounted drive portion and an integral guide portion, said guide portion carrying a cam follower member which rides along the outside lateral edge of said cam member as said drive member passes along said portion of said closed loop path, where said outside lateral edge of said cam member is shaped to pivot and hold said drive portion in a driving engagement orientation relative to said pivot means.

4. A conveyor system as defined in claim 1, wherein said drive means for moving said drive members comprises an endless horizontal chain trained about a pair of spaced chain sprockets, power means for turning one of said chain sprockets, and mounting means for holding said drive members extending upwardly from said chain at equal spaced intervals.

5. A conveyor system as defined in claim 1, further comprising means for pivotally interconnecting the inner ends of said parallel rods to said inner frame member to allow said outer end of said conveyor sections to be swung upwardly.

6. A conveyor system as defined in claim 5, wherein said means for pivotally interconnecting the inner ends of said parallel rods to said inner frame member comprises a cylindrical sleeve secured to said inner frame member, and a third rod slidably mounted in said sleeve and projecting beyond the ends of said sleeves with said parallel rods transversely extending from the opposite ends of said third rod.

* * * * *